United States Patent [19]
Phillips

[11] Patent Number: 5,515,839
[45] Date of Patent: May 14, 1996

[54] DEVICE FOR REMOVING A RACK FROM A GRILL

[76] Inventor: Eva P. Phillips, 3888 Lunn Dr., Nashville, Tenn. 37218

[21] Appl. No.: 449,471

[22] Filed: May 19, 1995

[51] Int. Cl.⁶ .................................................. F24C 1/16
[52] U.S. Cl. .......................... 126/9 R; 126/25 R
[58] Field of Search .................. 126/25 R, 9 R

[56] References Cited

U.S. PATENT DOCUMENTS

| | | | |
|---|---|---|---|
| D. 274,686 | 7/1984 | Ambler | D7/337 |
| D. 290,923 | 7/1987 | Erickson | D7/337 |
| D. 301,673 | 7/1989 | Ogden | D7/402 |
| D. 327,602 | 7/1992 | Walker | D7/335 |
| 3,179,104 | 4/1965 | Chapman et al. | 126/9 R |
| 4,553,525 | 11/1985 | Ruble | 126/30 |
| 4,850,333 | 7/1989 | Dellrud et al. | 126/25 |
| 4,867,051 | 9/1989 | Schalk | 99/443 |
| 4,878,477 | 11/1989 | McLane | 126/41 |
| 5,103,799 | 4/1992 | Atanasio | 126/9 |
| 5,121,909 | 6/1992 | Stickell, III | 269/289 |
| 5,165,384 | 11/1992 | Knutson | 126/25 |
| 5,172,628 | 12/1992 | Pillsbury et al. | 99/421 |
| 5,178,126 | 1/1993 | Beller | 126/25 |
| 5,299,931 | 4/1994 | Lee | 126/25 R |

Primary Examiner—Carroll B. Dority
Attorney, Agent, or Firm—Waddey & Patterson; Mark J. Patterson

[57] ABSTRACT

The present invention discloses a device for removing a rack from a grill. In the present invention, a pair of strap members are attached to each side of the rack. These strap members have clips which engage the rack. The clip members are joined together by a strip. The strip can have a sufficient number of notches. A holder is also provided which has a handle joined to a base by two walls. The base comprises a pair of cradles each having a groove and tip. The handles are used so that the grooves engage the strap and the tips are engaged by the notches. The rack can then be removed from the grill at the desired time. The meat can then be turned without risk of flameup. The rack and meat can then be placed back on the grill.

15 Claims, 4 Drawing Sheets

DEVICE FOR REMOVING A RACK FROM A GRILL

BACKGROUND OF THE INVENTION

The present invention relates generally to a grill system and more particularly to a device for removing a rack from a grill.

It will be appreciated by those skilled in the art that backyard grills are very common. It will further be appreciated by those skilled in the art that one of the main causes of injury in use of a backyard grill is a flameup caused by drippings from meat and other foods being grilled dripping on a hot coal thereby causing a flameup. Presently, the prior art uses a combination of spray water and very long tongs. Unfortunately, this does not solve the problem. Additionally, many hands have been burned when turning a object on the grill because of the need to place hands over the projected heat.

What is needed, then, is a system which can be attached and unattached from the rack of the grill. This needed device must be capable of easy use. This device must increase safety. This device must reduce the chances of flameup. This device must be simple and inexpensive to manufacture and use. This device is presently lacking in the prior art.

SUMMARY OF THE INVENTION

The present invention discloses a device for removing a rack from a grill. In the present invention, a pair of strap members are attached to each side of the rack. These strap members have clips which engage the rack. The clip members are joined together by a strip. The strip can have a sufficient number of notches. A holder is also provided which has a handle joined to a base by two walls. The base comprises a pair of cradles each having a groove and tip. The handles are used so that the grooves engage the strap and the tips are engaged by the notches. The rack can then be removed from the grill at the desired time. The meat can then be turned without risk of flameup. The rack and meat can then be placed back on the grill.

Accordingly, one object of the present invention is to provide a device for removing a rack from a grill.

A still further object of the present invention is to provide such a device which reduces the likelihood of flameup.

A still further object of the present invention is to provide a device which can easily be attached to an existing rack.

Another object of the present invention is to provide a device which is simple and inexpensive to manufacture.

DESCRIPTION OF THE PREFERRED EMBODIMENT

Figure 1:
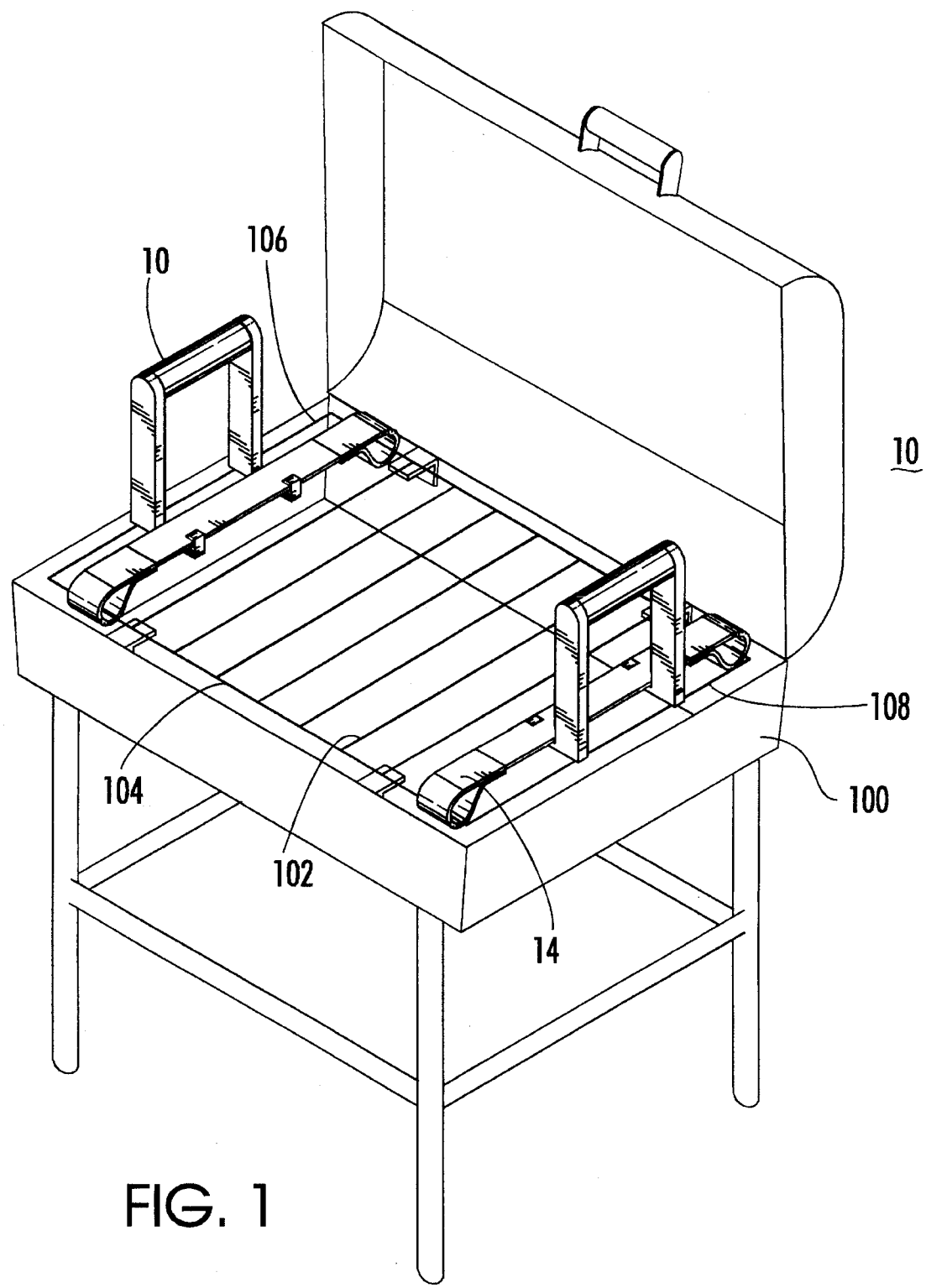
FIG. 1 is an exploded perspective view of the device of the present invention.
Figure 2:
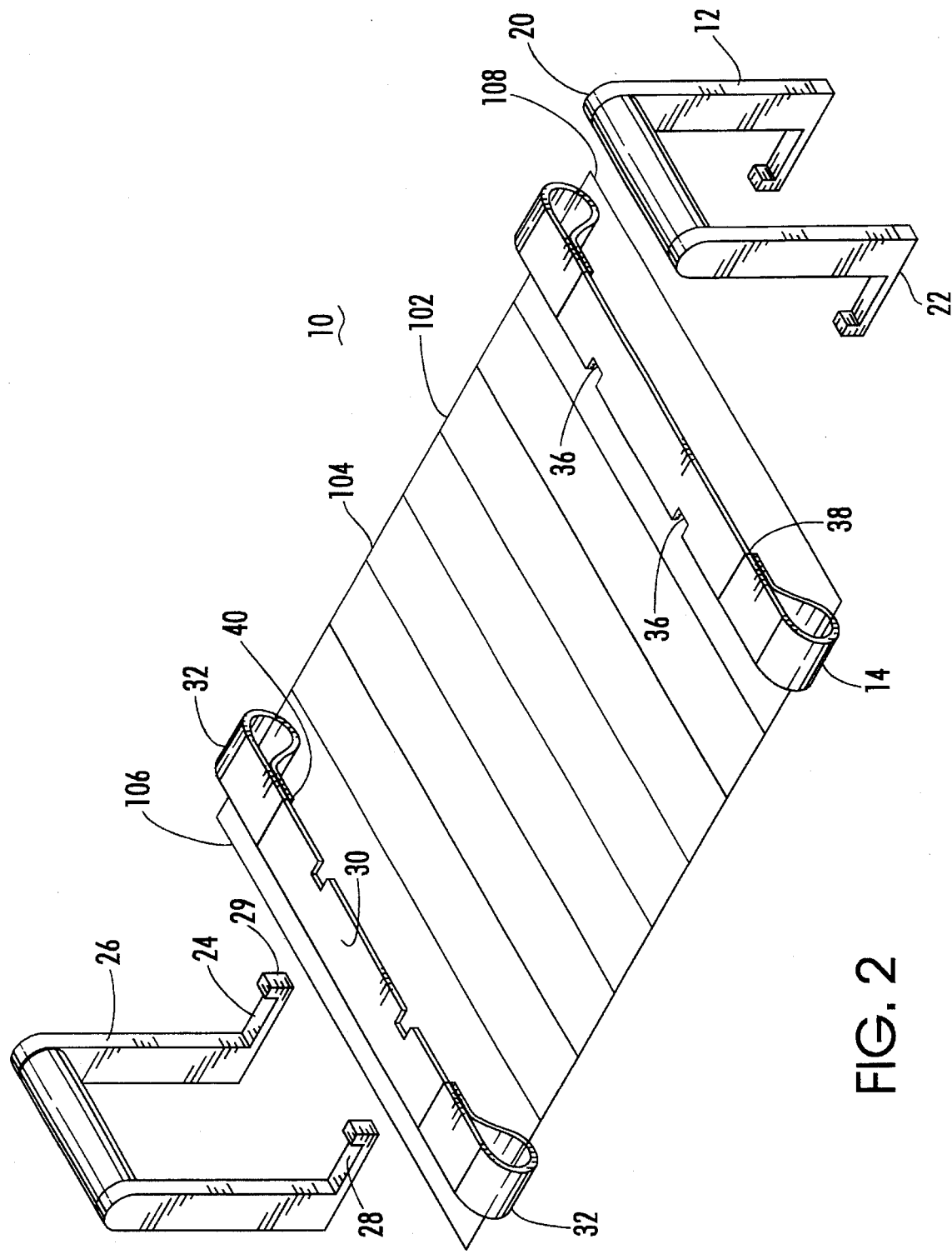
FIG. 2 is an exploded plan view of the device of the present invention.
Figure 3:
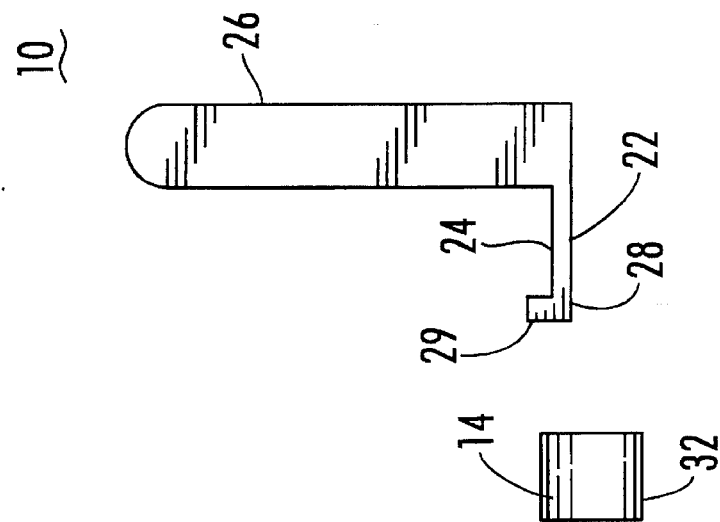
FIG. 3 is an exploded side view of the device of the present invention.
Figure 4:
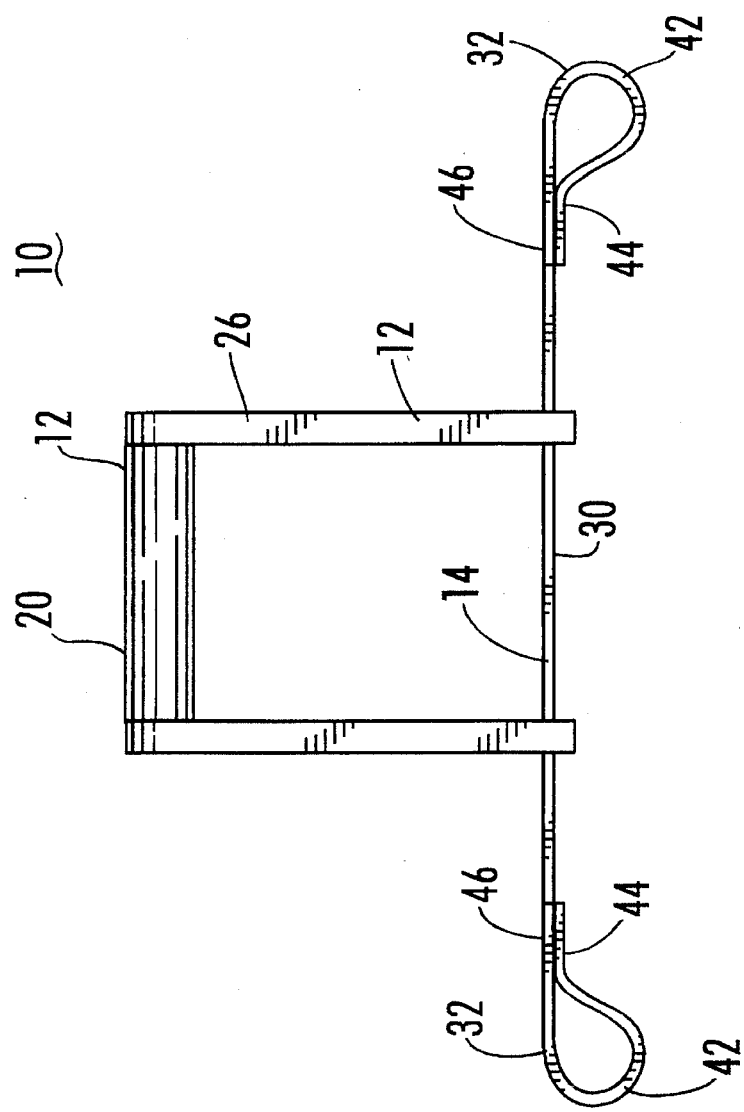
FIG. 4 is a frontal view of the device of the present invention.
Figure 5:
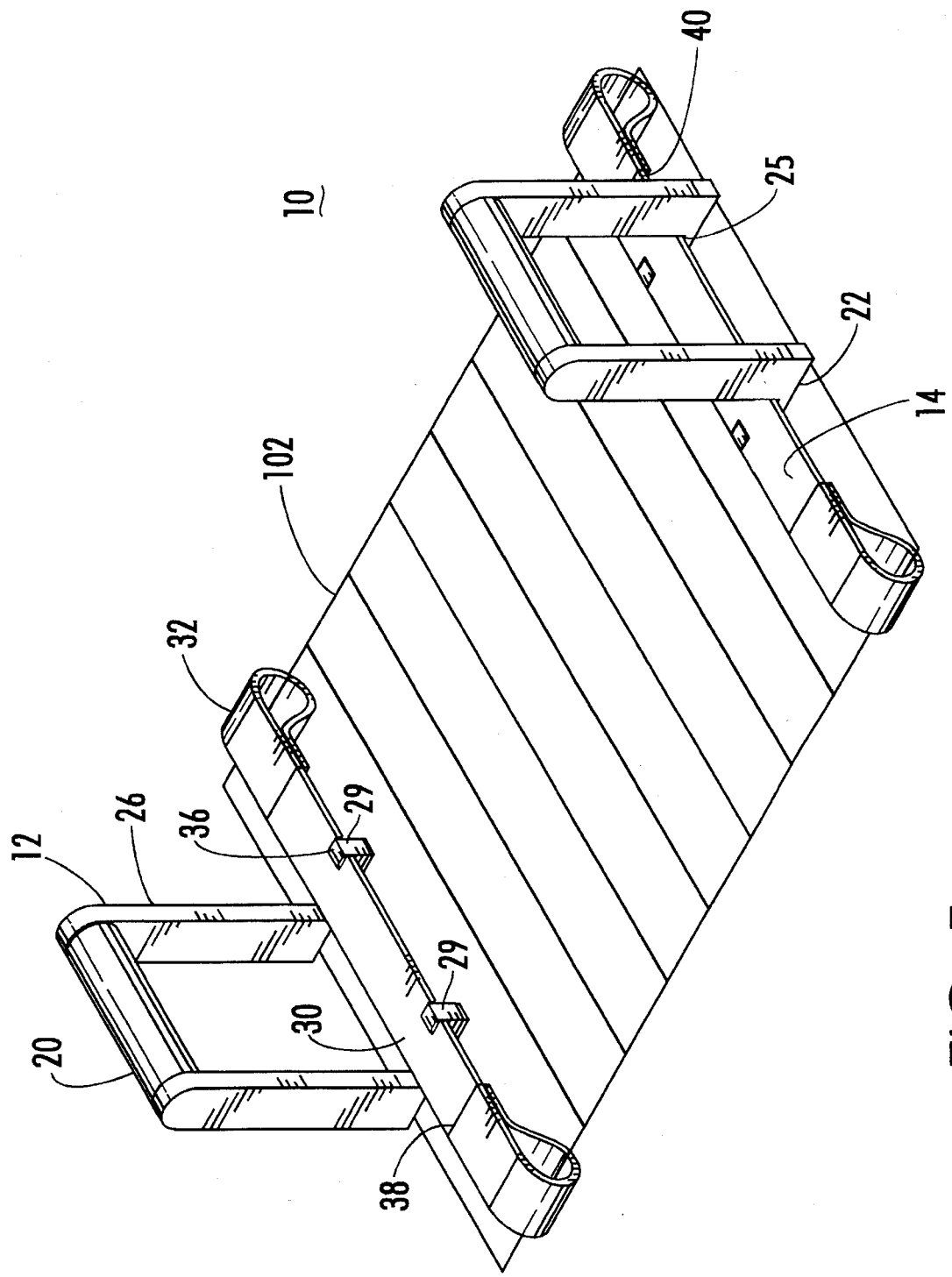
FIG. 5 is a perspective view of the device of the present invention.

Referring now to FIGS. 1–5 in combination there is shown generally at 10 the device for removing a rack from a grill of the present invention. Holder 12 has handle 20 joined to base 22 by a pair of opposed side walls 26. Base 22 is a pair of cradles 28 having grooves 24 separating side walls 26 from tips 29. Conversely, strap member 14 has strip 30 having proximal side 38 and distal side 40. At each of sides 30, 38 there is placed clip 32 which is biased. Clips 32 attach to each side 16, 18 of rack 102 of grill 100. Rack 102 has perimeter wire 104 and left side 106 and right side 108. After strap member 14 is attached to rack 102, holder 12 is maneuvered such that grooves 24 engage strip 30 and tips 28 are engaged by notches 36. The element formed by tip 29 and groove 24 may be referred to as cradle 28.

In the preferred embodiment, clips 32 have loops 42 which bias tongs 44 from upper sides 46. Strap member 14 can be integrally manufactured through such methods as molding, extrusion, or bending to produce clips 32. Conversely, clip 32 can be attached to strip 30 through welding or any other generally known metallic attachment method. Notches 36 can be molded as such or cut out of strip 30. Strap member 14 is preferable made from any type of heat resistant steel. However, any heat resistant material may be used. Likewise, walls 26 and base 22 are heat resistant material. Handle 20 is preferably may from insulated material.

Device 10 is sized to fit a given rack 102 of a grill 100. Distance from clips 32 on a given strap member 14 is approximately the distance along either of sides 106, 108 of rack 102. Clips 32 are biased to fit over wire 110 along perimeter 108 of rack 102 but also to hold strap member 14 into place on wire 110.

Referring now to FIGS. 1–5, one can see how device 10 operates. One strap member 14 is attached to each side 106, 108 of rack 102. Clips 32 are attached to wire 110 along perimeter 108 such that one strap member 14 runs along each side 106, 108. This step is best performed when rack 102 is not hot. Grill 100 is then heated. Meat or other item to be grilled can be placed on rack 102 either while rack 102 is on grill 100 or when rack 102 has been removed from grill 100. Holders 12 releasibly engage strap member 14 as discussed above when user desires to remove rack from or place rack on grill 100. Holders are disengaged when rack 102 is in desired place.

Thus, although there have been described particular embodiments of the present invention of a new and useful device for removing a rack from a grill, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A system for grasping a rack of a grill, said rack having two sides, said system comprising:
   a. a pair of holders each having a handle connected to a base having a groove; and
   b. a corresponding pair of strap members, each having means for attachment to one of said sides of said rack attached to means for engaging said groove.

2. The system of claim 1 wherein said means for attachment to one of said sides of said rack comprises a clip.

3. The system of claim 1 wherein said means for attachment to one of said sides of said rack comprises a pair of clips.

4. The system of claim 1 wherein said means for engaging said groove comprises a strip attached to said means for attachment to one of said sides of said rack.

5. The system of claim 2 wherein said means for engaging said groove comprises a strip attached to said clip.

6. The system of claim 3 wherein said means for engaging said groove comprises a strip attached to said clips.

7. The system of claim 1 wherein said means for attachment to one of said sides of said rack is releasible.

8. The system of claim 5 wherein said strip has a notch to receive to said base.

9. The system of claim 5 wherein said strip has a notch to receive to said base.

10. A device for removing a rack from a grill comprising:
 a. a holder having a handle;
 b. means for grasping said rack; and
 c. means attached to said holder for engaging said means for grasping said rack.

11. The device of claim 10 wherein said means for grasping said rack comprises a pair of strap members.

12. The device of claim 11 wherein each of said strap members comprise:
 a. a strip having a proximal end and a distal end; and
 b. a clip attached to each of said proximal end and said distal end.

13. The device of claim 12 wherein said clips being releasible.

14. The device of claim 10 wherein said holder comprises a base having a groove attached to said handle.

15. A device for removing a rack having two sides from a grill comprising:
 a. a pair of strap members releasibly attachable to said sides of said rack, each of said strap members having strip and two ends, said strap member having a clip at each of said ends, said strip having a pair of notches; and
 b. a holder having a handle joined to a base by a pair of walls, said base having a pair of cradles each having a groove for receiving said strip and a tip received by one of said notches.

* * * * *